US005638056A

United States Patent [19]

Nakashima et al.

[11] Patent Number: 5,638,056

[45] Date of Patent: Jun. 10, 1997

[54] REMOTE CONTROL APPARATUS

[75] Inventors: Yutaka Nakashima; Hiroshi Miyake; Atsuhisa Ando; Yukihiro Yamamoto, all of Kariya; Tomonori Suzuki; Masachika Kamiya, both of Toyota, all of Japan

[73] Assignee: Kabushiki Kaisha Toyoda Jidoshokki Seisakusho, Kariya, Japan

[21] Appl. No.: 436,201

[22] PCT Filed: Sep. 13, 1994

[86] PCT No.: PCT/JP94/01516

§ 371 Date: May 4, 1995

§ 102(e) Date: May 4, 1995

[87] PCT Pub. No.: WO95/07829

PCT Pub. Date: Mar. 23, 1995

[30] Foreign Application Priority Data

| | | | |
|---|---|---|---|
| Sep. 16, 1993 | [JP] | Japan | 5-230416 |
| Sep. 5, 1994 | [JP] | Japan | 6-211490 |

[51] Int. Cl.$^6$ .......... H04Q 9/00

[52] U.S. Cl. .......... 340/825.71; 340/825.72; 340/825.73; 340/825.69; 340/825.31

[58] Field of Search .......... 340/825.71, 825.72, 340/825.69, 825.31, 825.52, 825.73

[56] References Cited

U.S. PATENT DOCUMENTS 4,315,249 2/1982 Apple et al. .......... 340/825.52

FOREIGN PATENT DOCUMENTS

| | | |
|---|---|---|
| 0480246 | 5/1992 | European Pat. Off. . |
| 0515860 | 12/1992 | European Pat. Off. . |
| 3324956 | 1/1985 | Germany . |
| 3605350 | 9/1987 | Germany . |

*Primary Examiner*—Edwin C. Holloway, III
*Attorney, Agent, or Firm*—Brooks Haidt Haffner & Delahunty

[57] ABSTRACT

A first carrier signal generator (15) generates a carrier signal (S1) at a first frequency to modulate a preset identification code (S). A second carrier signal generator (16) generates a carrier signal (S2) at a second frequency, distinct from the first frequency. A modulator (14) affixes the identification code (S) to the carrier signal (S2), and outputs the carrier signal (S2) to a light-emitting circuit (17). When a "smart" or "learning" remote controller, of the type that demodulates frequency, receives the identification code (S), the carrier signal (Sw) of the second frequency is demodulated at the first frequency, compressed and stored in memory. The carrier signal (S2) set at the second frequency can cause the memory capacity of the remote controller to overflow, thereby preventing the identification code (S) from being stored in the learning remote controller.

13 Claims, 9 Drawing Sheets

REMOTE CONTROL APPARATUS

TECHNICAL FIELD

The present invention relates to a remote control apparatus designed to prevent the copying of an identification code output from a transmitter constituting the remote control apparatus.

BACKGROUND ART

For automobiles with power assisted door locks, the doors of the automobile are locked or unlocked by a locking mechanism operated by a motor provided in a door. Door locking or unlocking is accomplished by operating a switch inside the door when a driver is sitting in the driver's seat. To lock or unlock the door from outside the automobile, the driver places a key into a key hole provided in the door and turns the key.

Recently, systems have been used that lock or unlock the doors by remote operation from nearby the automobile using a remote control apparatus which comprises a transmitter and a receiver. The transmitter of the remote control apparatus may be provided in the grip of the ignition key or in the key holder. The receiver is provided inside the automobile.

FIG. 11 shows a block diagram of a transmitter T and a receiver R of a remote control apparatus. The transmitter T comprises an operation circuit 41, a decoder 42, a modulator 43, a carrier signal generator 44 and a light-emitting circuit 45. The receiver R comprises a light-receiving circuit 46, an amplifier 47, a demodulator 48, a decoder 49 and a code discriminating circuit 50. A door lock controller 51, connected to the code discriminating circuit 50, controls the locking or unlocking of the doors.

When a transmission switch 52, provided in the circuit 41 of the transmitter T is depressed, an identification code (hereinafter called "ID code") stored in the transmitter T is output to the modulator 43 from the decoder 42. The modulator 43 receives a carrier signal at a predetermined frequency (e.g., 38 kHz) from the carrier signal generator 44. Then, the modulator 43 modulates the frequency of the ID code with the carrier signal and outputs it as a modulation signal to the light-emitting circuit 45. The light-emitting circuit 45 produces an infrared signal from the modulation signal and transmits it to the receiver R.

The light-receiving circuit 46 in the receiver R provided inside the automobile, receives the modulated infrared-ray signal sent from the light-emitting circuit 45 of the transmitter T, and outputs this signal to the amplifier 47. The amplifier 47 amplifies the modulated signal to a predetermined level, and outputs it to the demodulator 48. The demodulator 48 extracts only the ID code from the signal and demodulates it to obtain a reception signal. This reception signal is output to the decoder 49. The decoder 49 decodes the reception signal to a reception code and outputs it to the code discriminating circuit 50.

The code discriminating circuit 50 compares the reception code with a discrimination code stored previously in the receiver R. When the reception code does not coincide with the discrimination code, the code discriminating circuit 50 erases the reception code and stands by until the next reception code is input. When the reception code coincides with the discrimination code, the code discriminating circuit 50 outputs a signal to the door lock controller 51 to unlock the doors when the doors are locked, or another signal to lock the doors when the doors are unlocked.

Recently, Audio-Visual machines and electric home appliances can be manipulated by a single "smart" remote controller. This "smart" or "learning" remote controller is designed to store an ID code (data) transmitted from a remote controller supplied with each machine. There are three ways that the learning remote controller stores the ID data of each machine. First, demodulation at a predetermined frequency is triggered by an operation signal from the transmitter of each machine, data compression is performed, and then the compressed data is stored in a memory area. Second, a modulation frequency is detected at the beginning of the operation signal, all signals are demodulated at that modulation frequency, data compression is performed, and the compressed data is stored in the memory area. Third, the frequency of the operation signal sent from the transmitter is determined. If this frequency is equal to or higher than a predetermined frequency, then a modulation system is assumed or considered as "learned". The modulation frequency and operation signal are demodulated and are stored in the memory area by the learning remote controller. When the frequency of data is below a specific frequency, it is assumed or "learned" that a baseband system exists. The ON/OFF periods of time for each data is measured and stored in the memory by the remote controller. With regard to the transmitter of a vehicle, the ID code may easily be stored or copied by the above methods. This unfortunately allows people other than the owner of the vehicle to unlock the doors.

Generally, the memory area of the learning remote controller has a relatively small capacity to store compressed data. If information is transmitted that causes the capacity of the memory area to overflow, the data cannot be stored. For the above type of learning remote controllers, if the signal at the beginning portion of the operation signal has a frequency different from the modulation frequency, any subsequent signal cannot be correctly read.

Accordingly, it is a primary objective of the present invention to provide a remote control apparatus which prevents an identification code from being stored in a learning remote controller.

It is another objective of this invention to provide a remote control apparatus which can more surely prevent an identification code from being stored in a learning remote controller.

DISCLOSURE OF THE INVENTION

A remote control apparatus of the present invention includes first carrier signal generating means for generating a first carrier signal of a first frequency for use in the frequency modulation of an identification code signal; transmission means for transmitting the frequency modulated identification code signal; second carrier signal generating means for generating a second carrier signal of a second frequency different from the first frequency; and affixing means for affixing the second carrier signal of the second frequency to the frequency modulated identification code signal and for outputting the identification code to the transmission means. The second carrier signal has a length of a given time. The first carrier signal generating means outputs a first carrier signal of the first frequency for use in the frequency modulation of an identification code signal. The second carrier signal generating means outputs a second carrier signal of the second frequency different from the first frequency. The affixing means affixes the second carrier signal to an arbitrary portion of the identification code signal whose frequency is modulated based on the first carrier signal, and outputs it to the transmission means. The first carrier signal including the identification code and the second carrier signal including no identification code exist for a given period of time. When a smart or learning remote controller of the type which always performs demodulation with the first frequency tries to store the identification code, the second carrier signal of the second frequency is also demodulated with the first frequency and is stored after data compression. Therefore, the second carrier signal can cause the memory capacity of the learning remote controller to overflow. As a result, it is possible to prevent the identification code from being stolen by the learning remote controller. When a learning remote controller of the type which detects the modulation frequency in synchronism with the head signal tries to store the identification code, demodulation is performed based on either the first carrier signal of the first frequency affixed to the head or the second carrier signal of the second frequency. Accordingly, the subsequent carrier signal cannot be demodulated correctly and the correct identification code cannot be detected. This prevents the identification code from being stolen by the learning remote controller. Further, even when a learning remote controller of the type which discriminates the baseband signal tries to store the identification code, demodulation is performed after the discrimination of the baseband signal based on the signal affixed to the head as in the aforementioned case. Accordingly, the subsequent signal of a different frequency can cause the overflowing of the memory capacity of the learning remote controller. This prevents the identification code from being stolen by the learning remote controller.

A remote control apparatus of the present invention includes first carrier signal generating means for generating a first carrier signal of a first frequency for use in the frequency modulation of an identification code signal; transmission means for transmitting the frequency modulated identification code signal; second carrier signal generating means for generating a second carrier signal of a second frequency different from the first frequency; and affixing means for affixing the second carrier signal to a plurality of arbitrary portions of the frequency modulated identification code signal in such a manner that a total time of the second carrier signals at the plurality of portions becomes equal to or longer than a predetermined time, and outputting the identification code to the transmission means. Due to dividing the second carrier signal whose length is equal to or longer than a given time and affixing the divided signals to the portions of the frequency modulated identification code signals, a learning remote controller cannot extract the first carrier signal alone. Due to affixing the second carrier signal of the second frequency whose total time is equal to or longer than a given time to a plurality of arbitrary portions of the frequency modulated identification code signal, the memory capacity of the learning remote controller can surely be made to overflow. Further, since the second carrier signal is affixed to an arbitrary portion of the first carrier signal, it is difficult for the learning remote controller to store only the identification code. As a result, it is possible to prevent the identification code from being stolen by the remote controller.

A remote control apparatus of this invention includes first carrier signal generating means for generating a first carrier signal of a first frequency for use in the frequency modulation of an identification code signal; transmission means for transmitting the frequency modulated identification code signal; reception means for receiving the identification code signal sent from the transmission means; second carrier signal generating means for generating a second carrier signal of a second frequency, the second frequency lying within an attenuation region of a reception sensitivity of the reception means; and affixing means for affixing the second carrier signal to the frequency modulated identification code signal and outputting the identification code to the transmission means. The second carrier signal has a length of a given time. The first carrier signal generating means outputs a first carrier signal of the first frequency for use in the frequency modulation of the identification code signal. The second carrier signal generating means outputs a second carrier signal at the second frequency which lies within the attenuation region of the reception sensitivity of the reception means. The affixing means affixes the second carrier signal to an arbitrary portion of the identification code signal whose frequency is modulated based on the first carrier signal, and outputs it to the transmission means. As the second carrier signal is attenuated by the reception means, only the first carrier signal including the identification code is extracted. It is not necessary for conventional receivers to be modified, therefore, a significant cost-up can be prevented.

A remote control apparatus of this invention includes first carrier signal generating means for generating a first carrier signal of a first frequency for use in the frequency modulation of an identification code signal; transmission means for transmitting the frequency modulated identification code signal; and reception means for receiving the identification code signal sent from the transmission means; second carrier signal generating means for generating a second carrier signal of a second frequency lying within an attenuation region of a reception sensitivity of the reception means; and affixing means for affixing the second carrier signal to a plurality of arbitrary portions of the frequency modulated identification code signal in such a manner that a total time of the second carrier signals at the plurality of portions becomes equal to or longer than a predetermined time, and outputting the identification code to the transmission means. The second carrier signal, the second frequency of which lies within the attenuation region of the reception sensitivity of the reception means, is divided into a plurality of signal segments. They are affixed to a plurality of arbitrary portions of the frequency modulated identification code signal. Therefore, the second carrier signal can make the memory capacity of the learning remote controller surely overflow. Since the second carrier signal, which as a whole becomes equal to or longer than a given time, is affixed to a plurality of arbitrary portions of the first carrier signal, it is difficult for a learning remote controller to store only the first carrier signal including the identification code. As a result, it is possible to prevent the identification code from being stolen by the remote controller.

In the remote control apparatus of this invention, the affixing means affixes the second carrier signal to a head of the frequency modulated identification code signal and outputs the identification code signal to the transmission means. As the second carrier signal is affixed to the head of the identification code signal, the setting of the time for affixing the second carrier signal is easy. Further, by distinguishing the first carrier signal from the second carrier signal, which has been affixed to the head and does not include the identification code, at the time a transmission signal is received by the reception means, the identification code alone can easily be extracted without correcting the extracted identification code. Furthermore, the learning remote controller, which synchronizes with the head signal and detects the identification code signal based on the synchronized modulation frequency, performs demodulation based on the second carrier signal of the second frequency which has come to the head. Therefore, the subsequent carrier signal of the first frequency cannot be demodulated accurately. This prevents the identification code from being memorized by the learning remote controller.

A remote control apparatus of this invention includes first carrier signal generating means for generating a first carrier signal of a first frequency for use in the frequency modulation of a plurality of identification code signals; transmission means for transmitting the frequency modulated identification code signals; second carrier signal generating means for generating a second carrier signal of a second frequency different from the first frequency; and affixing means for affixing the second carrier signal to each of the plurality of frequency modulated identification code signals, and outputting the identification code signals to the transmission means. The first carrier signal generating means outputs a first carrier signal of the first frequency for use in the frequency modulation of a plurality of identification code signals. The second carrier signal generating means outputs a second carrier signal whose frequency is different from the first frequency. The affixing means affixes the second carrier signal to each of the plurality of frequency modulated identification code signals, and outputs it to the transmission means.

When a plurality of identification code signals are to be transmitted, the second carrier signal of the second frequency is affixed to each of the identification code signals, thus making it difficult to extract only the first carrier signal including the identification code. It is therefore possible to prevent the identification code from being stolen by a learning remote controller. Further, the learning remote controller, which synchronizes with the head signal and stores the identification code signal based on the synchronized modulation frequency, performs demodulation based on the carrier signal of the first frequency or the second frequency. Accordingly, the subsequent carrier signal cannot be demodulated correctly and the identification code cannot be stored accurately.

A remote control apparatus of this invention includes first carrier signal generating means for generating a first carrier signal of a first frequency for use in the frequency modulation of a plurality of identification code signals; transmission means for transmitting the frequency modulated identification code signals; reception means for receiving the identification code signals sent from the transmission means; second carrier signal generating means for generating a second carrier signal of a second frequency lying within an attenuation region of a reception sensitivity of the reception means; and affixing means for affixing the second carrier signal to each of the plurality of frequency modulated identification code signals, and outputting the identification code signals to the transmission means. The first carrier signal generating means outputs the first carrier signal of the first frequency for use in the frequency modulation of the plurality of identification code signals. The second carrier signal generating means outputs the second carrier signal of the second frequency which lies within the attenuation region of the reception sensitivity of the reception means. The affixing means affixes the second carrier signal to each of the plurality of frequency modulated identification code signals, and outputs it to the transmission means. As the second carrier signal is attenuated by the reception means, it is easy to distinguish the second carrier signal from the first carrier signal including the identification code. It is therefore easy to extract only the identification code without correcting the extracted identification code.

A remote control apparatus of this invention includes first carrier signal generating means for generating a first carrier signal of a first frequency for use in the frequency modulation of a plurality of identification code signals; transmission means for transmitting the frequency modulated identification code signals; second carrier signal generating means for generating a second carrier signal of a second frequency different from the first frequency; and affixing means for affixing the second carrier signal to a plurality of arbitrary portions of each frequency modulated identification code signal in such a manner that a total time of the second carrier signal at the plurality of portions becomes equal to or longer than a predetermined time, and outputting the identification code signal to the transmission means. The first carrier signal generating means outputs a first carrier signal of the first frequency for use in the frequency modulation of the plurality of identification code signals. The second carrier signal generating means outputs a second carrier signal of the second frequency different from the first frequency. The affixing means divides the second carrier signal, whose length is equal to or longer than a given time, into a plurality of signal segments, affixes these signal segments of the second carrier signal to arbitrary portions of each frequency modulated identification code signal to be output to the transmission means. There exists the second carrier signal which as a whole becomes a given time with respect to the first carrier signal including the identification code. When the learning remote controller of the type which detects the modulation frequency in synchronism with the head signal tries to store the identification code, therefore, the remote controller performs demodulation based on either the first carrier signal or the second carrier signal. Accordingly, the subsequent carrier signal cannot be demodulated correctly so that the learning remote controller cannot detect the accurate identification code. When a learning remote controller of the type which always performs demodulation with the first frequency tries to store the identification code signal, the learning remote controller demodulates the second carrier signal also with the first frequency and attempts to store its demodulated signal after data compression. As a result, the memory capacity of the learning remote controller overflows, so that the identification code can be prevented from being stolen.

In the remote control apparatus of this invention, the affixing means affixes the second carrier signal to a head of each of the plurality of frequency modulated identification code signals, and outputs the identification codes to the transmission means.

The first carrier signal generating means outputs a first carrier signal of the first frequency for use in the frequency modulation of a plurality of identification code signals. The second carrier signal generating means outputs a second carrier signal of the second frequency. The affixing means affixes the second carrier signal to the head of each of the plurality of frequency modulated identification code signals and outputs it to the transmission means. When a plurality of identification code signals are transmitted, the second carrier signal is affixed to the head of each identification code signal. This makes it difficult to extract only the first carrier signal including the identification code. Further, a smart or learning remote controller, which synchronizes with the head signal and stores the identification code based on the modulation frequency, performs demodulation based on either the first carrier signal or the second carrier signal. Therefore, the subsequent carrier signal cannot be demodulated accurately, and the learning remote controller cannot store the accurate identification code. It is thus possible to prevent the identification code from being stolen by the learning remote controller.

In the remote control apparatus of this invention, one of the first carrier signal generating means and the second carrier signal generating means is means for dividing or multiplying the frequency of a signal output from the other one. One of the first and second carrier signal generating means divides or multiplies the frequency the signal from the other one. By making a simple modification to one carrier signal generating means, therefore, the other carrier generating means can be provided, eliminating the need for an oscillator in each signal generating means. This can contribute to simplifying the remote control apparatus and making it compact.

BRIEF DESCRIPTION OF DRAWINGS

FIGS, 10A, 10B and 10C are block diagrams illustrating essential portions of transmitters of remote controllers according to modifications of the invention.

BEST MODE FOR CARRYING OUT THE INVENTION (First Embodiment)

A remote control apparatus for a vehicle according to a first embodiment of the present invention will be described below with reference to FIGS. 1 through 4.

Figure 2:
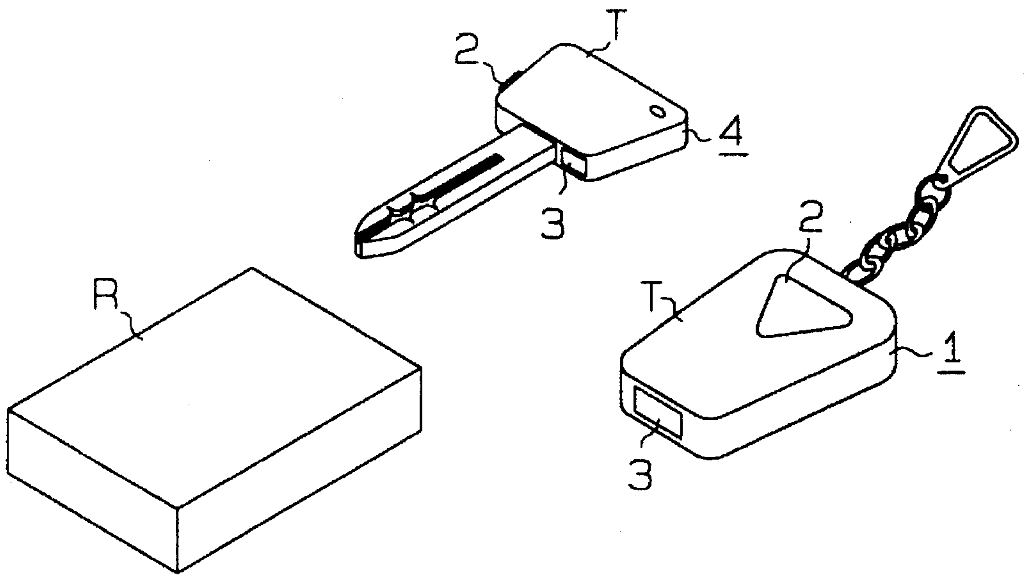
FIG. 2 is a perspective view showing a key holder, an ignition key and the receiver.
Figure 3:
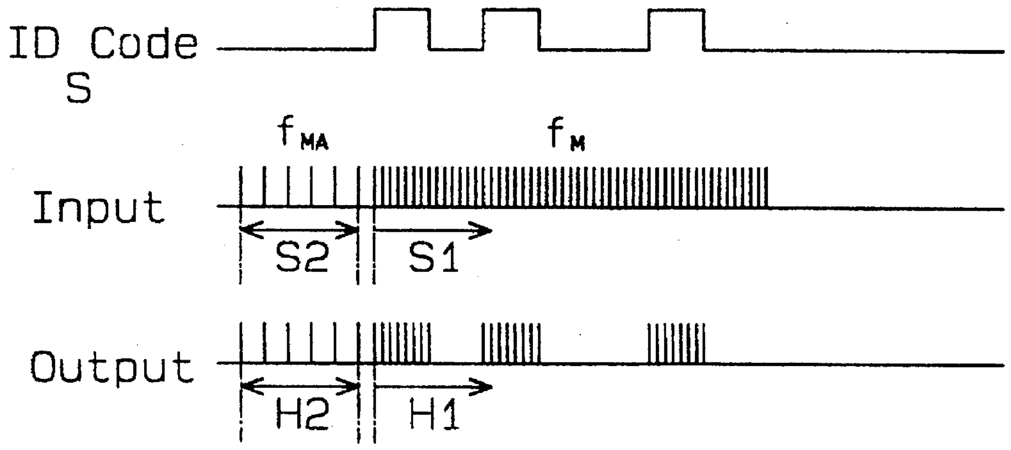
FIG. 3 is an explanatory diagram showing input and output signals of a modulator in a first embodiment of the invention.

As shown in FIG. 2, a transmitter T is incorporated in a key holder 1. A push button 2 is provided on the top of the key holder 1. Provided at the front face of the key holder 1 is a light-emitting section 3 comprising an infrared signal emitting element. A receiver R is provided inside an unillustrated vehicle.

Figure 1:
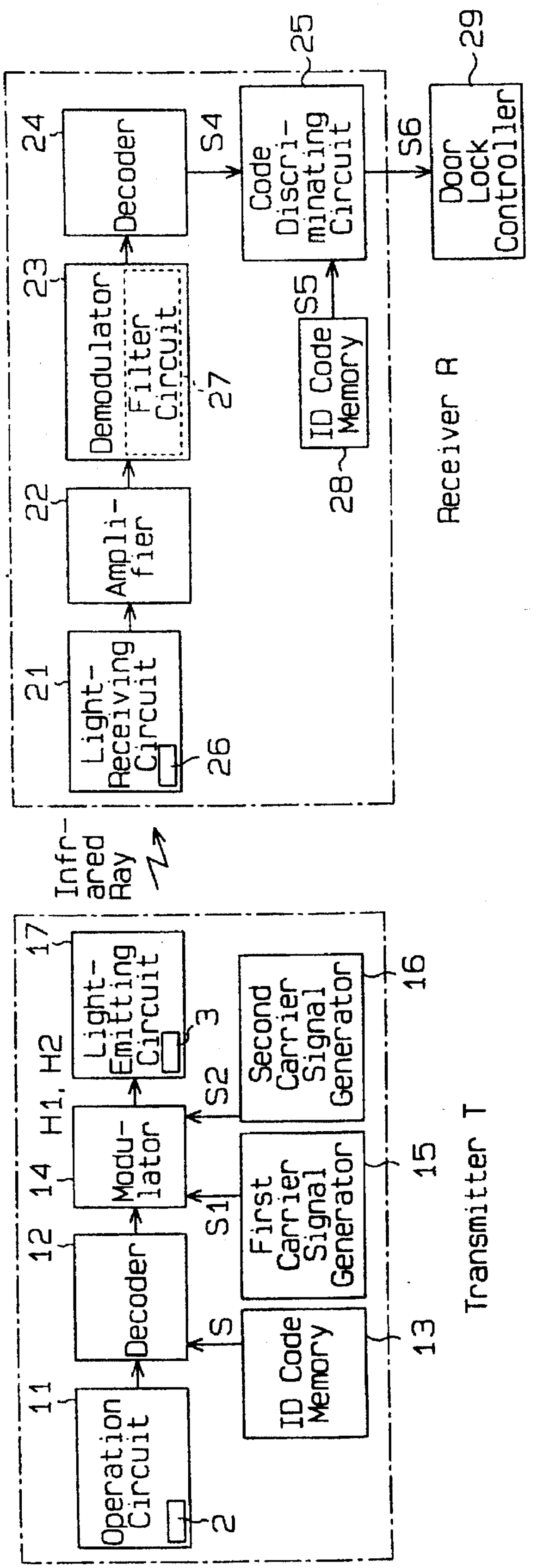
FIG. 1 is a block diagram of a transmitter and receiver of a remote control apparatus according to the present invention.

As shown in FIG. 1, the transmitter T comprises an operation circuit 11, a decoder 12, an ID code memory 13, a modulator 14, a first carrier signal generator 15, a second carrier signal generator 16, and a light-emitting circuit 17 as a transmission means. The modulator 14 and the second carrier signal generator 16 form an affixing means.

The operation circuit 11 is provided with the push button 2. The decoder 12 is connected to the operation circuit 11, which outputs a depression or activation signal to the decoder 12 by the operation of the push button 2.

The ID code memory 13 and modulator 14 are connected to the decoder 12. The ID code memory 13 is a non-volatile memory device in which a previously set ID code S is stored. When the depression signal originating from the operation of the push button 2 is input to the decoder 12, the decoder 12 reads the ID code S from the ID code memory 13, and outputs it to the modulator 14 after serial-parallel conversion.

The first carrier signal generator 15, the second carrier signal generator 16 and the light-emitting circuit 17 are connected to the modulator 14. The first carrier signal generator 15 generates a first carrier signal S1 at a predetermined frequency $f_M$ (38 kHz in this embodiment) and outputs it to the modulator 14. The second carrier signal generator 16 generates a second carrier signal S2 at a frequency $f_{MA}$, which is the frequency of the first carrier signal S1 divided by $\alpha$ (divided by 4 to be 9.5 kHz in this embodiment). The generator 16 then outputs it to the modulator 14.

When the push button 2 is operated, the second carrier signal generator 16 outputs the second carrier signal S2 to the modulator 14. The second carrier signal S2 is frequency-modulated and is output as a modulation signal H2, as it is, to the light-emitting circuit 17 for a given time. Thereafter, the first carrier signal generator 15 outputs the first carrier signal S1 to the modulator 14. The modulator 14 modulates the frequency of the ID code S based on this first carrier signal S1, and outputs modulation signal H1 of the ID code S to the light-emitting circuit 17.

The light-emitting circuit 17 is provided with the light-emitting section 3. The light-emitting circuit 17 causes the light-emitting section 3 to emit light based on the input of the modulation signals H1 and H2 from the modulator 14. The light-emitting circuit then transmits the modulation signals H1 and H2 by an infrared signal.

The structure of the receiver R will now be discussed.

As shown in FIG. 1, the receiver R comprises a light-receiving circuit 21, an amplifier 22, a demodulator 23, a decoder 24 and a code discriminating circuit 25.

The light-receiving circuit 21 is provided with a light-receiving element 26. The amplifier 22 is connected to the light-receiving circuit 21. When the light-receiving element 26 receives the infrared signal sent from the light-emitting section 3 of the transmitter T, the light-receiving circuit 21 converts the signal to an electric signal and outputs it to the amplifier 22.

The demodulator 23 is connected to the amplifier 22. The signal received by the light-receiving element 26 is input to the amplifier 22. The amplifier 22 amplifies the input signal to a level suitable for the demodulator 23, and then outputs the amplified signal to the demodulator 23.

Figure 4:
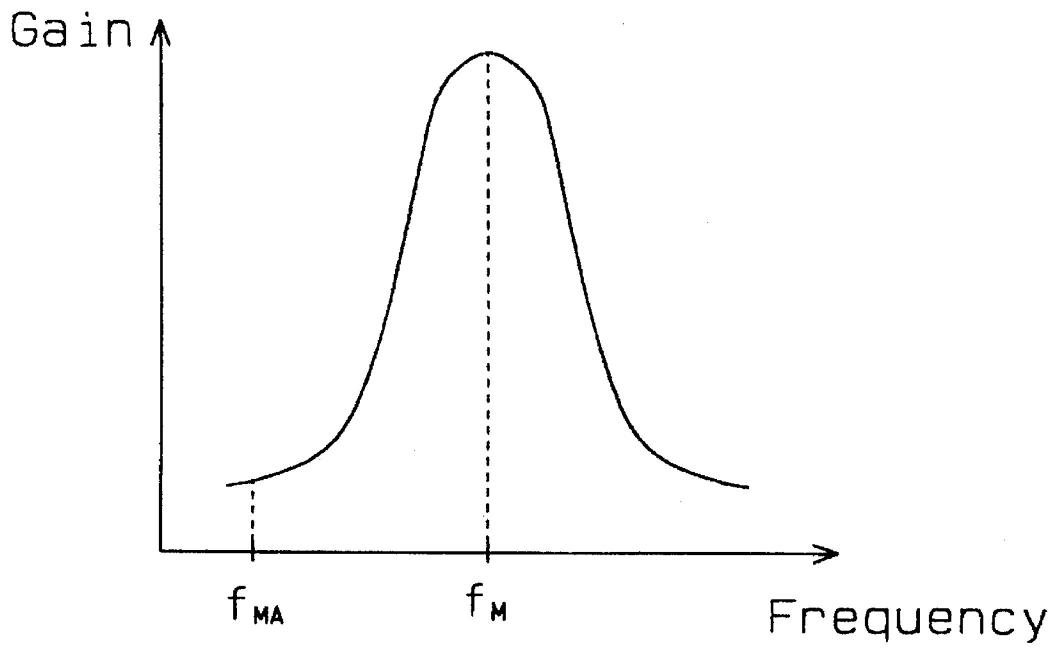
FIG. 4 is a diagram showing the frequency-gain characteristic of a filter circuit incorporated in a demodulator.

The decoder 24 is connected to the demodulator 23. The demodulator 23 incorporates a filter circuit 27. The amplified modulation signals H1 and H2 are input to this filter circuit 27. The signal output from the filter circuit 27 alone is demodulated by the demodulator 23. The filter circuit 27 is set in such a way as to maximize the gain of the carrier signal S1 at the frequency $f_M$ and to reduce the gain of the second carrier signal S2 at the frequency $f_{MA}$, as shown in FIG. 4. The signal S2 is in this way attenuated. The frequency that falls in the attenuation region of the filter circuit 27 is selected at the time the frequency $f_{MA}$ of the second carrier signal S2 is set.

Therefore, the frequency $f_{MA}$ component of the second carrier signal S2 in the modulation signal H2 is attenuated by the filter circuit 27, but is not extracted. Only the frequency $f_M$ component of the first carrier signal S1 in the modulation signal H1 is extracted (output) from the filter circuit 27, and the modulation signal H1 is demodulated by the demodulator 23. The demodulator 23 outputs the demodulated ID code S as a reception signal to the decoder 24.

The code discriminating circuit 25 is connected to the decoder 24. The decoder 24 performs serial-parallel conversion on the reception signal of the ID code S output from the demodulator 23, and outputs it as a reception code S4 to the code discriminating circuit 25.

An ID code memory 28 and a door lock controller 29 are connected to the code discriminating circuit 25. A discrimination code S5 is preset in the ID code memory 28. This discrimination code S5 matches with the aforementioned ID code S. When receiving the reception code S4, the code discriminating circuit 25 reads the discrimination code S5 stored in the ID code memory 28 and compares the reception code S4 with the discrimination code S5. When the reception code S4 matches the discrimination code S5, the code discriminating circuit 25 outputs a door lock control signal S6 to the door lock controller 29 to lock or unlock the doors.

A description will now be given of the action of the remote control apparatus.

A driver approaches an automobile and pushes the push bottom 2 of the key holder 1 to unlock the doors. The operation circuit 11 of the transmitter T, incorporated in the key holder 1, outputs a depression signal to the decoder 12 based on the operation of the push button 2. Then, the second carrier signal generator 16 outputs the second carrier signal S2 at the frequency $f_{MA}$ to the modulator 14 for a preset time. The modulator 14 modulates the frequency of the second carrier signal S2 directly and outputs it to the light-emitting circuit 17.

The decoder 12 reads the ID code S stored in the ID code memory 13 in response to the depression signal. The decoder 12 performs serial-parallel conversion on the read ID code S, and outputs it to the decoder 12 after the second carrier signal S2 has stopped being output to the modulator 14. The first carrier signal generator 15 outputs the first carrier signal S1 at the frequency $f_M$ to the modulator 14 either at the same time the ID code S is output to the modulator 14 from the decoder 12 or after the second carrier signal S2 has stopped being output to the modulator 14.

When receiving the ID code S and first carrier signal S1, the modulator 14 modulates the frequency of the ID code S based on this first carrier signal S1 and outputs it as the modulation signal H1 to the light-emitting circuit 17. The light-emitting circuit 17 causes the light-emitting section 3 to emit light based on the input modulation signals H1 and H2 and sends it as an infrared ray to the receiver R.

The light-receiving circuit 21 of the receiver R receives the infrared signal, sent from the transmitter T, at the light-receiving element 26. The light-receiving circuit 21 converts the infrared signal to an electric signal, and outputs the modulation signals H1 and H2 to the amplifier 22. The amplifier 22 amplifies the modulation signals H1 and H2 to a level necessary for input to the demodulator 23. These amplified signals are then output to the demodulator 23. The frequency $f_{MA}$ component of the second carrier signal S2 in the modulation signal H1 and H2 is attenuated by the filter circuit 27 of the demodulator 23 so that only the frequency $f_M$ component of the first carrier signal S1 is extracted. The demodulator 23 demodulates the modulation signal H1, extracted by the filter circuit 27, and outputs it to the decoder 24. The decoder 24 performs serial-parallel conversion on the demodulated signal to produce the input ID code S, and then outputs it as the reception code S4 to the code discriminating circuit 25.

The code discriminating circuit 25 compares the input reception code S4 with the discrimination code S5 stored in the ID code memory 28. At this time, the reception code S4 coincides with the discrimination code S5. As a result, the code discriminating circuit 25 outputs the door lock control signal S6 to the door lock controller 29. In response to the door lock control signal S6, the door lock controller 29 locks or unlocks the doors.

The remote control apparatus of this embodiment affixes, the second carrier signal S2 set at the frequency $f_{MA}$ to the beginning of ID code S. The frequency $f_{MA}$ of the second carrier signal S2 is different from the frequency $f_M$ of the first carrier signal S1. The remote control apparatus then transmits ID code S from the transmitter T.

At the time the "smart" remote controller, of the type which performs demodulation at a predetermined frequency, begins to store the ID code S, demodulation and data compression are performed based on the frequency $f_M$ of the first carrier signal S1. If the second carrier signal S2 is, at the same time, demodulated at frequency $f_M$ and if data compression is performed, an excessively large area will be required. As a result, the memory capacity of the learning remote controller overflows.

When the learning remote controller, of the type which detects the modulation frequency at the beginning of the operation signal, begins to store the ID code, demodulation is performed based on the frequency $f_{MA}$ of the second carrier signal S2 affixed to the beginning of the operation signal. This makes it impossible to accurately read the ID code S modulated by the frequency $f_M$ of the first carrier signal S1.

Accordingly, it is possible to prevent the ID code S from being stored in any of the above two learning remote controllers.

A brief description will be given of how the memory capacity of the learning remote controller overflows if the frequencies of the modulation signals H1 and H2 sent from the transmitter T differ from each other.

Figure 6:
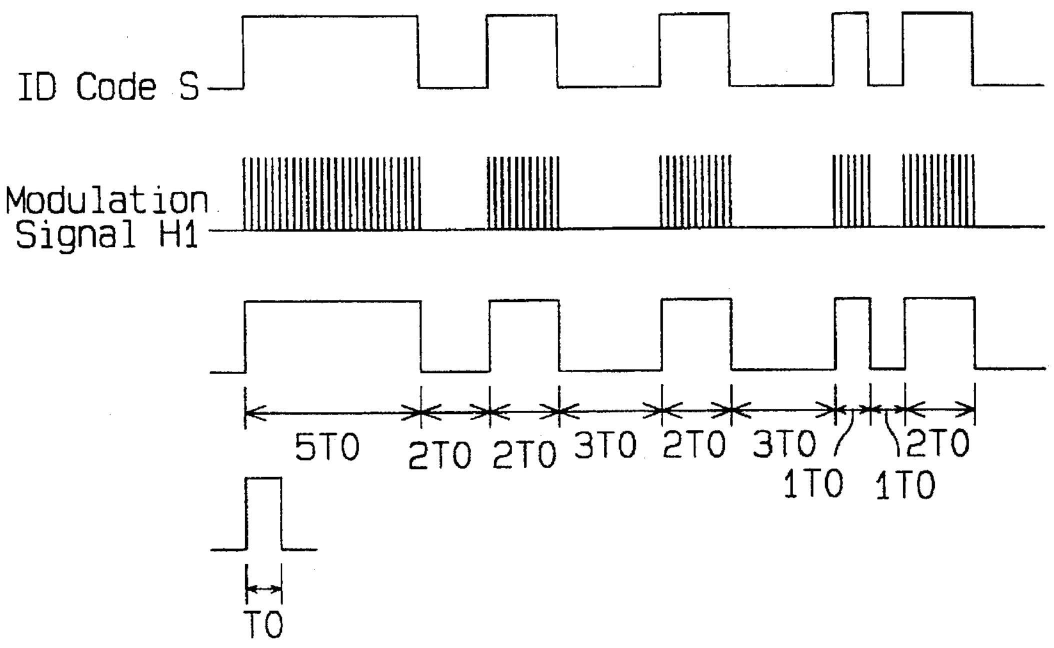
FIG. 6 is an explanatory diagram explaining how a learning remote controller stores an ID code.

Referring to FIG. 6, a "smart" remote controller (not shown) is set to a learning mode, and the transmitter T is directed to the learning remote controller. When the push button 2 of the transmitter is operated, the ID code S is modulated based on the frequency of the first carrier signal S1 at 38 kHz and then transmitted to the "smart" remote controller. The remote controller determines the frequency with which the ID code S has been modulated. Upon determining that the frequency is 38 kHz, the learning remote controller measures the time period during which the modulation signal H1 is at a H level (high potential) or at a L level (low potential), based on a reference pulse T0.

In this case, the individual periods of time of the modulation signal H1 are illustrated as 5T0, 2T0, 2T0, 3T0, 2T0, 3T0, 1T0, 1T0 and 2T0. The remote controller stores these periods of time in memory. Thereafter, when the remote controller is operated it transmits the modulation signal H1 corresponding to these time periods.

Figure 7:
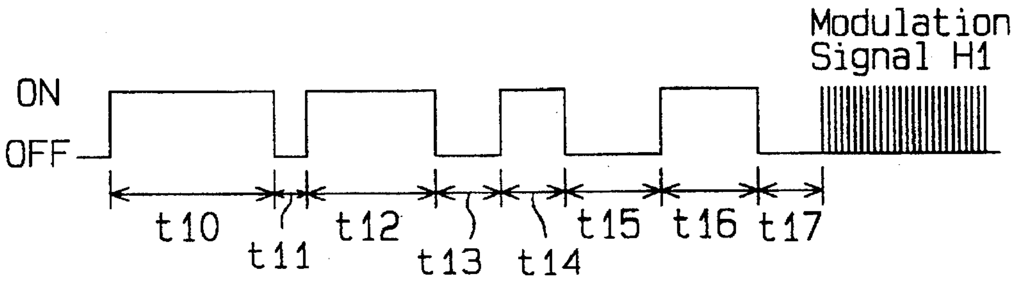
FIG. 7 is an explanatory diagram explaining how a learning remote controller stores an ID code.

As shown in FIG. 7, when the ID code S is transmitted based on the carrier signal of 15 kHz or lower, the remote controller measures the ON/OFF duration of the light-emitting section 3. As shown in FIG. 7, the periods of time are t10, t11, t12, t13, t14, t15, t16 and t17. The remote controller then stores these times t10 to t17 in memory. Upon further operation, the remote controller controls the ON/OFF operation of its light-emitting section 3 based on the times t10 to t17 and transmits the ID code S.

When the second carrier signal S2 of 9.5 kHz is affixed at the beginning of the ID code S, the controller initiates a mode of operation to measure the time during which the light-emitting section 3 is on or off. After this time, when the modulation signal H1 is transmitted, the ON/OFF times for each cycle of the modulation signal H1 consequently measured. When the frequency of the first carrier signal S1 is high, the number of ON/OFF times which have to be stored increases. Because the memory area of the controller cannot store all the ON/OFF times of the modulation signal H1, memory overflow occurs. The result is that ID code S is prevented from being stored in the learning remote controller.

Since the frequency $f_{MA}$ of the second carrier signal S2 is $1/\alpha$ the frequency $f_M$ of the first carrier signal S1, signal S2 can be generated by a simple circuit. In addition, the frequency $f_{MA}$ is set to comply with the frequency gain characteristics of the filter circuit 27. Consequently, only the reception signal modulated with the first carrier signal S1 can be extracted from the modulation signals H1 and H2 without having to modify the receiver R.

(Second Embodiment)

A second embodiment of the present invention will now be described. Since the structure of the transmitter T and receiver R are the same as those of the first embodiment, reference will be made to FIG. 1, without redescribing their structure.

Figure 5:
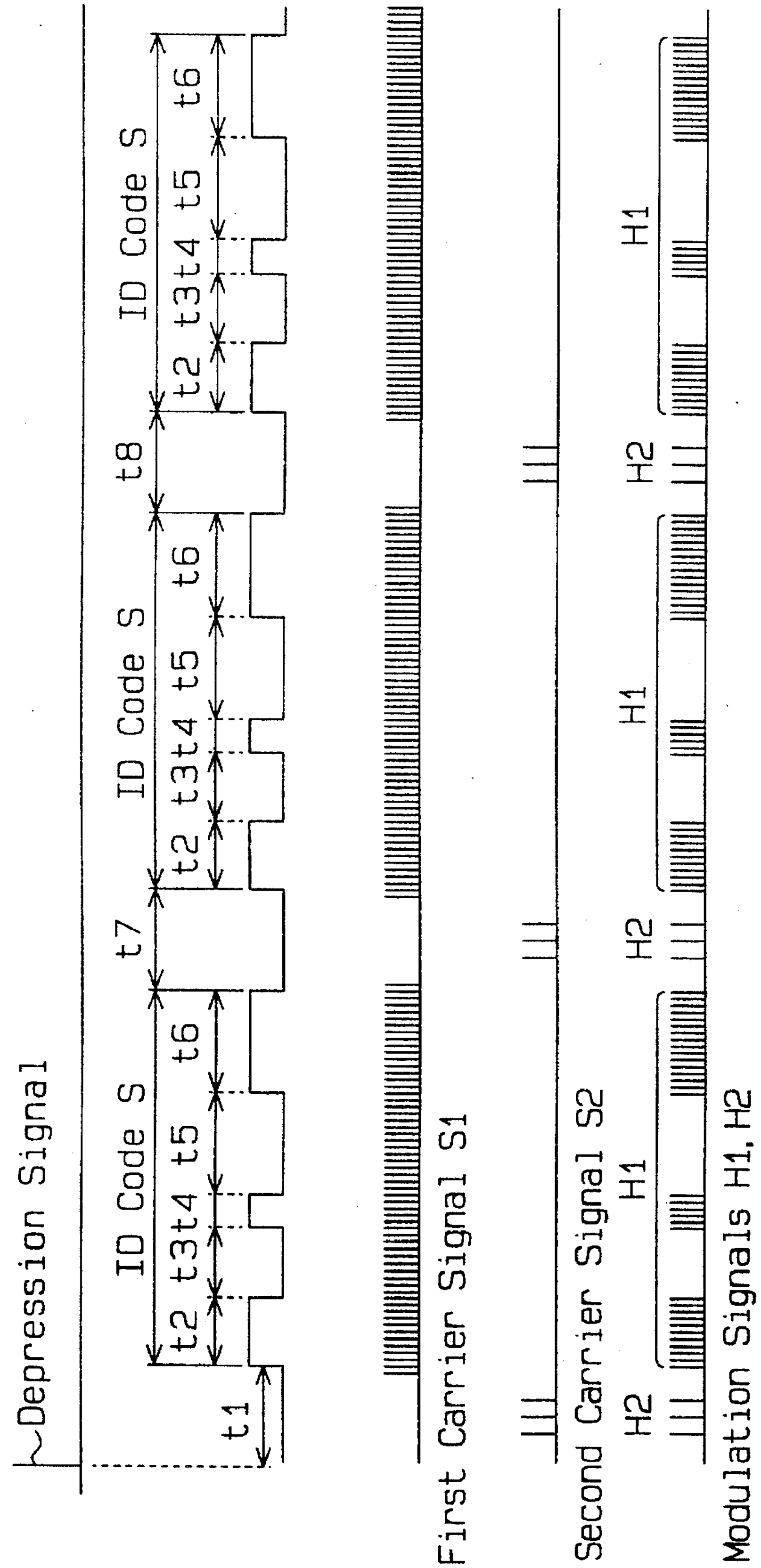
FIG. 5 is an explanatory diagram showing input and output signals of a modulator in a second embodiment of the invention.

When the operation circuit 11 outputs the depression or activation signal to the decoder 12 in response to the operation of the push button 2, the decoder 12 reads the ID code S from the ID code memory 13, performs serial-parallel conversion on the ID code S three times following a predetermined time t1, and outputs it to the modulator 14, as shown in FIG. 5. Individual data segments of the ID code S are previously determined as time intervals t2 to t6. Period of time t7 is a time interval from when the output of the first ID code S to the modulator 14 is completed to when the output of the second ID code S begins, while period of time t8 is a time interval from when the output of the second ID code S is completed to when the output of the third ID code S begins. The time periods t7 and t8 are also determined previously. In this embodiment, time period t7 is set equal to time period t8.

When the predetermined time t1 passes after depression signal is output from the operation circuit 11 to the decoder 12, the second carrier signal generator 16 outputs the second carrier signal S2 at the frequency $f_{MA}$ (9.5 kHZ in this embodiment), which is $1/\alpha$ the frequency $f_M$ of the modulator 14 for a given time (several tens of milliseconds in this embodiment).

During the time period t7 from when the first ID code S is output to the modulator 14 from the decoder 12 to when the output of the second ID code S to the modulator 14, the second carrier signal generator 16 outputs the second carrier signal S2 at the frequency $f_{MA}$ to the modulator 14 for a given time. Likewise, during the time period t8, the second carrier signal generator 16 outputs the second carrier signal S2 at the frequency $f_{MA}$ to the modulator 14.

During the time t2–t6 when the decoder 12 outputs each of the first to third ID codes S, the first carrier signal generator 15 outputs the first carrier signal S1 to the modulator 14. While the output of the first carrier signal S1 to the modulator 14 can be slightly longer than the period t2–t6 during the output of a single ID code S, the period of carrier signal S1 is set not to overlap that of the second carrier signal S2.

Therefore, the frequency of the second carrier signal S2 is modulated directly by the modulator 14 into the modulation signal H2, which is output to the light-emitting circuit 17. The frequency of each ID code S is modulated, based on the first carrier signal S1, into the modulation signal H1, which is output to the light-emitting circuit 17. The light-emitting circuit 17 causes the light-emitting section 3 to emit light based on the modulation signals H1 and H2 input from the modulator 14, and transmits the modulation signals H1 and H2 on an infrared signal to the receiver R.

Thus, in response to the operation of the push button 2, the second carrier signal S2 at the frequency $f_{MA}$ is affixed to the beginning of each ID code S. The frequency $f_{MA}$ of the second carrier signal S2 is $1/\alpha$ (¼ in this embodiment) of the frequency $f_M$ of the first carrier signal S1 and is lower than that of the first carrier signal S1. The affixed signal is transmitted to the receiver R from the transmitter T.

When the light-receiving element 26 in the circuit 21 receives the infrared modulation signals H1 and H2 from the light-emitting section 3, the light-receiving circuit 21 converts the modulation signals H1 and H2 to electric signals and outputs them to the amplifier 22. The amplifier 22 amplifies the electric modulation signals H1 and H2 to a level suitable for the demodulation of the demodulator 23, and outputs them to the demodulator 23.

Of the amplified modulation signals H1 and H2, the modulation signal H2 which becomes the second carrier signal S2 is attenuated by the filter circuit 27, and only the modulation signal H1 which becomes the first carrier signal S1 is extracted. The demodulator 23 demodulates this modulation signal H1. The demodulator 23 outputs the demodulated ID code S as a reception signal to the decoder 24. The decoder 24 performs serial-parallel conversion on the reception signal and outputs it as the reception code S4 to the code discriminating circuit 25.

When receiving the reception code S4 from the decoder 24, the code discriminating circuit 25 reads the discrimination code S5 from the ID code memory 28 and determines whether or not the reception code S4 coincides with the discrimination code S5. When the reception code S4 does not match with the discrimination code S5, the code discriminating circuit 25 determines that the ID code S is different, clears the reception code S4 output from the decoder 24, and waits for a new reception code S4 output from the decoder 24.

When the reception code S4 matches with the discrimination code S5, the code discriminating circuit 25 determines that the correct ID code S has been transmitted, and outputs the door lock control signal S6 to the door lock controller 29 to lock or unlock the doors.

A description will now be given of the action of the thus constituted remote control apparatus.

A driver approaches an automobile and pushes the push button 2 of the key holder 1 to unlock the doors. The operation circuit 11 of the transmitter T, incorporated in the key holder 1, outputs a depression or activation signal to the decoder 12 in response to the operation of the push button 2. Then, the decoder 12 reads the ID code S stored in the ID code memory 13. Meanwhile, the second carrier signal generator 16 outputs the second carrier signal S2 at the frequency $f_{MA}$ to the modulator 14 for a given time, during the time from when the output of the depression signal begins to when a predetermined time t1 has elapsed. The frequency of the second carrier signal S2 is modulated by the modulator 14 into the modulation signal H2, which is output to the light-emitting circuit 17. The light-emitting circuit 17 causes the light-emitting section 3 to emit light in response to the modulation signal H2, and sends the modulation signal H2 on an infrared ray to the receiver R.

When the predetermined time t1 elapses after the input of the depression signal to the decoder 12, the decoder 12 outputs the first ID code S to the modulator 14. While the decoder 12 is outputting the ID code S to the modulator 14, i.e., during times t2–t6, the first carrier signal generator 15 outputs the first carrier signal S1 to the modulator 14. The modulator 14 modulates the frequency of the ID code signal S in accordance with the first carrier signal S1, and outputs it as the modulation signal H1 to the light-emitting circuit 17. The light-emitting circuit 17 causes the light-emitting section 3 to emit light in accordance with the modulation signal H1, and sends the modulation signal H1 on an infrared ray to the receiver R.

During the time from the transmission of the first ID code S as the modulation signal H1 to when the time t7 elapses, the second carrier signal generator 16 outputs the second carrier signal S2 to the modulator 14. This second carrier signal S2 becomes the modulation signal H2 to be transmitted to the receiver R, in the same manner as described above. When the time t7 elapses and at the same time or slightly before the second ID code S is output to the modulator 14, the first carrier signal generator 15 outputs the first carrier signal S1 to the modulator 14. While the ID code signal S is being output to the modulator 14, this first carrier signal S1 is also output to the modulator 14. The modulator 14 modulates the frequency of the ID code signal S into the modulation signal H1 based on the first carrier signal S1, and outputs the modulation signal H1 to the light-emitting circuit 17. The light-emitting circuit 17 causes the light-emitting section 3 to emit light based on the modulation signal H1, and sends the modulation signal H1 on an infrared ray to the receiver R.

During the time from the transmission of the second ID code signal as the modulation signal H1 to when the time t8 passes, the second carrier signal S2 is output to the modulator 14. This second carrier signal S2 becomes the modulation signal H2 to be transmitted to the receiver R in the same manner as described above. When the time t8 passes, the decoder 12 and the first carrier signal generator 15 respectively output the third ID code S and the first carrier signal S1 to the modulator 14, in the same manner as described above. The modulator 14 modulates the frequency of the ID code signal S based on the first carrier signal S1.

Thus, the light-emitting circuit 17 transmits the infrared modulation signals H1 and H2, sequentially output from the modulator 14, to the receiver R from the light-emitting section 3.

The modulation signals H1 and H2, sequentially sent from the transmitter T to the light-receiving element 26, are converted to electric signals by the light-receiving circuit 21 and are amplified by the amplifier 22. The amplified modulation signals H1 and H2 are output to the filter circuit 27 of the demodulator 23. The modulation signal H2 of the frequency $f_{MA}$ is attenuated by the filter circuit 27, and only the modulation signal H1 of the frequency $f_M$ is extracted. The demodulator 23 demodulates the extracted modulation signal H1. The demodulator 23 outputs the demodulated ID code signal S as the reception signal to the decoder 24. The decoder 24 performs serial-parallel conversion on the reception signal, and outputs it as the reception code S4 to the code discriminating circuit 25.

When receiving the reception code S4 from the decoder 24, the code discriminating circuit 25 reads the discrimination code S5 from the ID code memory 28 and determines whether or not the reception code S4 matches with the discrimination code S5. When the reception code S4 does not coincide with the discrimination code S5, the code discriminating circuit 25 determines that the codes are different from each other, clears the reception code S4 output from the decoder 24, and waits for a new reception code S4 output from the decoder 24.

When the reception code S4 matches with the discrimination code S5, the code discriminating circuit 25 determines that the correct ID code S has been transmitted, and outputs the door lock control signal S6 to the door lock controller 29 to lock or unlock the doors.

According to the second embodiment, in the case where a plurality of ID codes S are transmitted to the receiver R from the transmitter T, the second carrier signals S2 each having a different frequency are affixed to the beginnings of the individual ID codes S for a given time.

In a transmitter T by which a second carrier signal S2 is affixed only to the beginning of the first ID code S, it is possible that the second or third ID code S from the transmitter T is timely stored or stolen by a smart or learning remote controller after the transmission of the second carrier signal S2. If the second carrier signal S2 is affixed to the beginning of each ID code signal S, therefore, it will be difficult that the learning remote controller receives only the ID code S excluding the second carrier signal S2. This surely prevents the ID code S from being stored in the remote controller.

In order to make the memory capacity of the learning remote controller to overflow and to prevent the ID code S from being stolen, it is desirable that the frequency of the second carrier signal S2 be equal to or lower than 15 kHz. When the second carrier signal S2 has a frequency of 9.5 kHz, 128 or more pulse signals should be read into the learning remote controller to cause the overflow of the memory capacity. The lower the frequency becomes, the longer the time for outputting 128 or more pulses becomes.

According to the second embodiment, however, since the time intervals such as t1, t7 and t8 between ID codes transmission periods can be easily changed as desired, 128 or more pulse signals can surely be affixed to the beginning of each ID code signal S. This causes the overflow of the memory capacity of the learning remote controller, thus preventing the ID code S from being stolen.

In the second embodiment, if a learning remote controller first detects a middle portion of the first or second modulation signal H1, originating from the first carrier signal S1, it enters the mode for measuring the H-level and L-level durations of the modulation signal H1 as shown in FIG. 6. However, the ID code signal S based on the modulation signal H1 cannot be stored correctly. In this case, the learning remote controller attempts to store the modulation signal H1 to be transmitted next. Before the remote controller receives the next modulation signal H1 as the next ID code signal S, however, the modulation signal H2 of the second carrier signal S2 is input to the remote controller. This carrier signal S2 has 128 or more pulse signals. Therefore, if the learning remote controller measures the L-level and H-level durations of the second carrier signal S2, its memory capacity will overflow so that the transmitted ID code S cannot be stored accurately. It is thus possible to surely prevent the ID code S from being stolen by the learning remote controller.

Although the second carrier signal S2 is affixed to the beginning or head portion of each ID code S for a given time in the second embodiment, the following modifications are possible.

Figure 8:
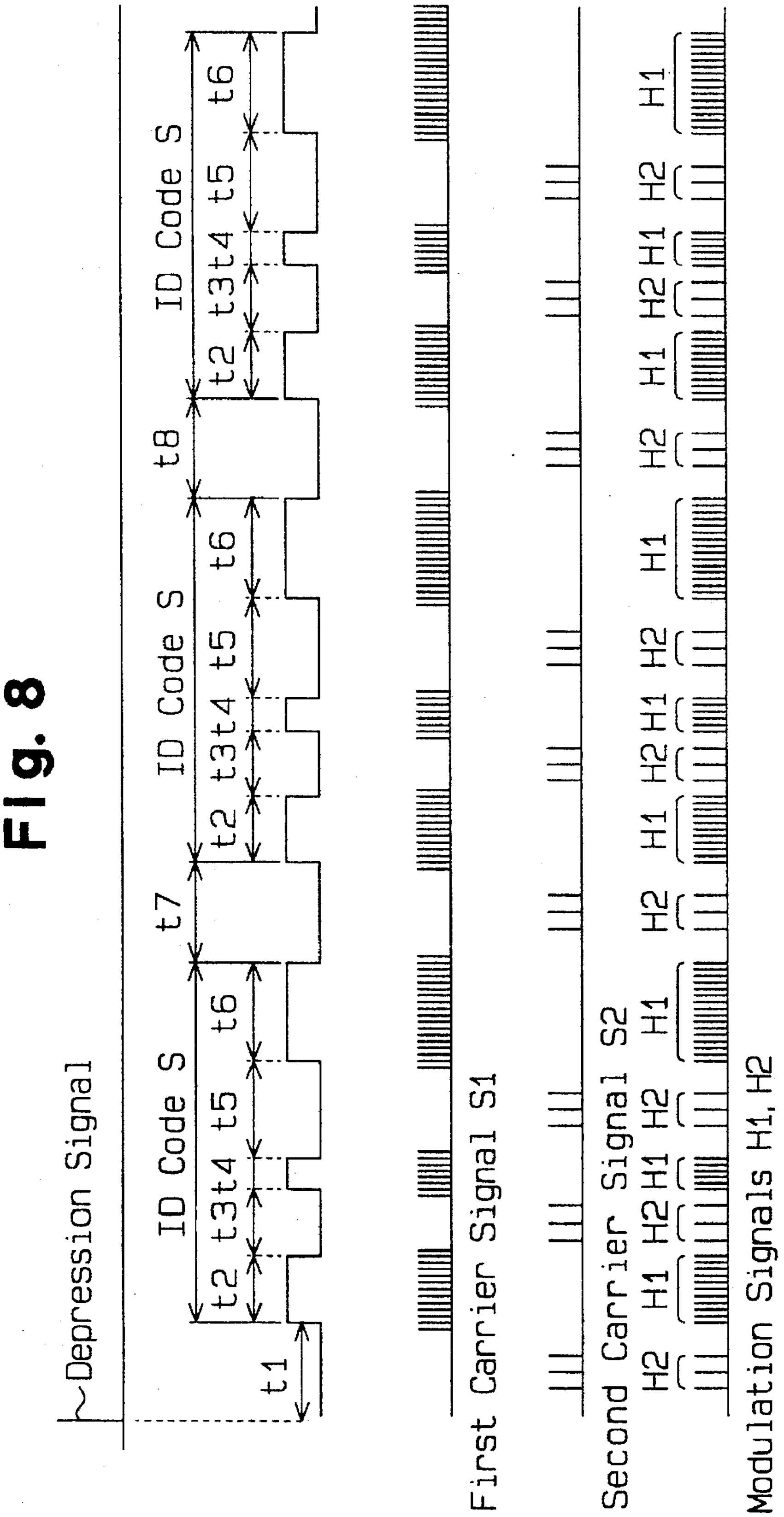
FIG. 8 is an explanatory diagram illustrating the input and output signals of another modulator based on the second embodiment.

As shown in FIG. 8, the period of time t1 is a time from when the push button 2 is manipulated to when the first ID code S is output to the modulator 14 from the decoder 12, and the periods of time t7 and t8 are time intervals from the transmission of each ID code S to the transmission of the next ID code S. The time periods t1, t7 and t8 and the time intervals t2–t6 of individual data of the ID code S are predetermined. The second carrier signal generator 16 is set to send an output to the modulator 14 even during the time where the data of one ID code S becomes an L level (time t3, t5 in this case). Then, the modulation signal H2 is output even when the modulation signal H1 becomes an L level.

As the L-level duration of each ID code S is short, it is difficult to affix the second carrier signal S2 every such L-level duration for a sufficient time to cause the overflow of the memory capacity of the learning remote controller. Accordingly, the second carrier signal S2 which has a length of a given time is multi-segmented. The division is performed in such a way that the segmented second carrier signal S2 does not overlap the H level of data in the ID code S. When the first ID code S is output to the modulator 14, the second carrier signal generator 16 outputs the second carrier signal S2, divided at the predetermined time t1, to the modulator 14. Then, the second carrier signal S2 divided at the time t3 is output to the modulator 14. Further, the second carrier signal S2 divided at the time t5 is output to the modulator 14.

The total time of the second carrier signals S2 divided at the times t1, t3 and t5 is set equal to the set time in the second embodiment, during which 128 or more pulses are generated.

When the second ID code signal S is output to the modulator 14, the second carrier signal generator 16 outputs the second carrier signal S, divided at the time t7, to the modulator 14, and thereafter outputs the second carrier signals S2 divided at the times t3 and t5 of the ID code S, to the modulator 14. Likewise, when the third ID code S is output to the modulator 14, the second carrier signal generator 16 outputs the second carrier signal S2, divided at the time t8, to the modulator 14, and thereafter outputs the second carrier signals S2 divided at the times t3 and t5 of the ID code S, to the modulator 14.

Therefore, the modulator 14 directly modulates the frequencies of the sequentially input second carrier signals S2. The modulated signals are transmitted as the modulation signals H2 to the receiver R from the light-emitting section 3 of the light-emitting circuit 17. The frequency of the ID code signal S is modulated based on the first carrier signal S1, and the modulated ID code signal S is transmitted as the modulation signal H1 to the receiver R from the light-emitting section 3 of the light-emitting circuit 17. The receiver R receives the modulation signals H1 and H2 sequentially transmitted over infrared rays, and the doors are locked or unlocked in the same manner as done in the above-described second embodiment.

In this modification, the second carrier signals S2, each of which has a length of a given time, are affixed to arbitrary portions of the ID code signal S. It is therefore difficult for a smart or learning remote controller to read only the modulation signal H1 cocorresponding to the ID code S. It is thus possible to more surely prevent the ID code S from being stolen by learning remote controllers.

When a learning remote controller detects the modulation signal H2 based on the second carrier signal S2 first, it measures the ON/OFF times of the light-emitting section 3 in the light-emitting circuit 17. Further, the remote controller detects and memorize the ON/OFF switching times of the light-emitting section 3 based on the first carrier signal S1. This causes the overflow of the memory capacity of the learning remote controller as per the second embodiment. Consequently, the ID code S can be prevented from being stolen by the learning remote controller.

When the learning remote controller detects the modulation signal H1 based on the first carrier signal S1 first, it measures the H-level and L-level durations of the modulation signal H1 sent from the light-emitting section 3 referring to the reference pulse T0. Accordingly, it also measures the H-level and L-level durations of the modulation signal H2 based on the second carrier signal S2, referring to the reference pulse T0. However, the total number of pulse signals of the divided second carrier signals. S2 before a next ID code signal S is transmitted becomes equal to or greater than 128. Thus, the divided second carrier signals S2 can surely cause the overflow of the memory capacity of the learning remote controller. It is therefore possible to surely prevent the ID code S from being stolen by learning remote controllers.

In this modification, the second carrier signal S2 is divided to a plurality of portions, which are output at the times t3 and t5 of the ID code S. This can shorten the intervals of the elapsing time t1 and the times t7 and t8, or shorten the time interval for transmitting a plurality of ID code signals S.

Although the divided carrier signals S2 are output in a well-regulated manner at the times t3 and t5 of the ID code S in this modification, it is not limited to this case and the divided carrier signals S2 may be output at arbitrary points as needed. In this case, the total time of the divided second carrier signals S2 should become a preset period of time for the output of one ID code signal S.

Although three ID code signals are transmitted in response to a depression or activation signal in this modification, the structure of the transmitter T may be modified so that the second carrier signal S2 having a length of a given time is multi-segmented and the multi-segmented signals are affixed to several portions of a single ID code signal S, wherein the single ID signal S is transmitted in response to one depression signal.

Figure 9:
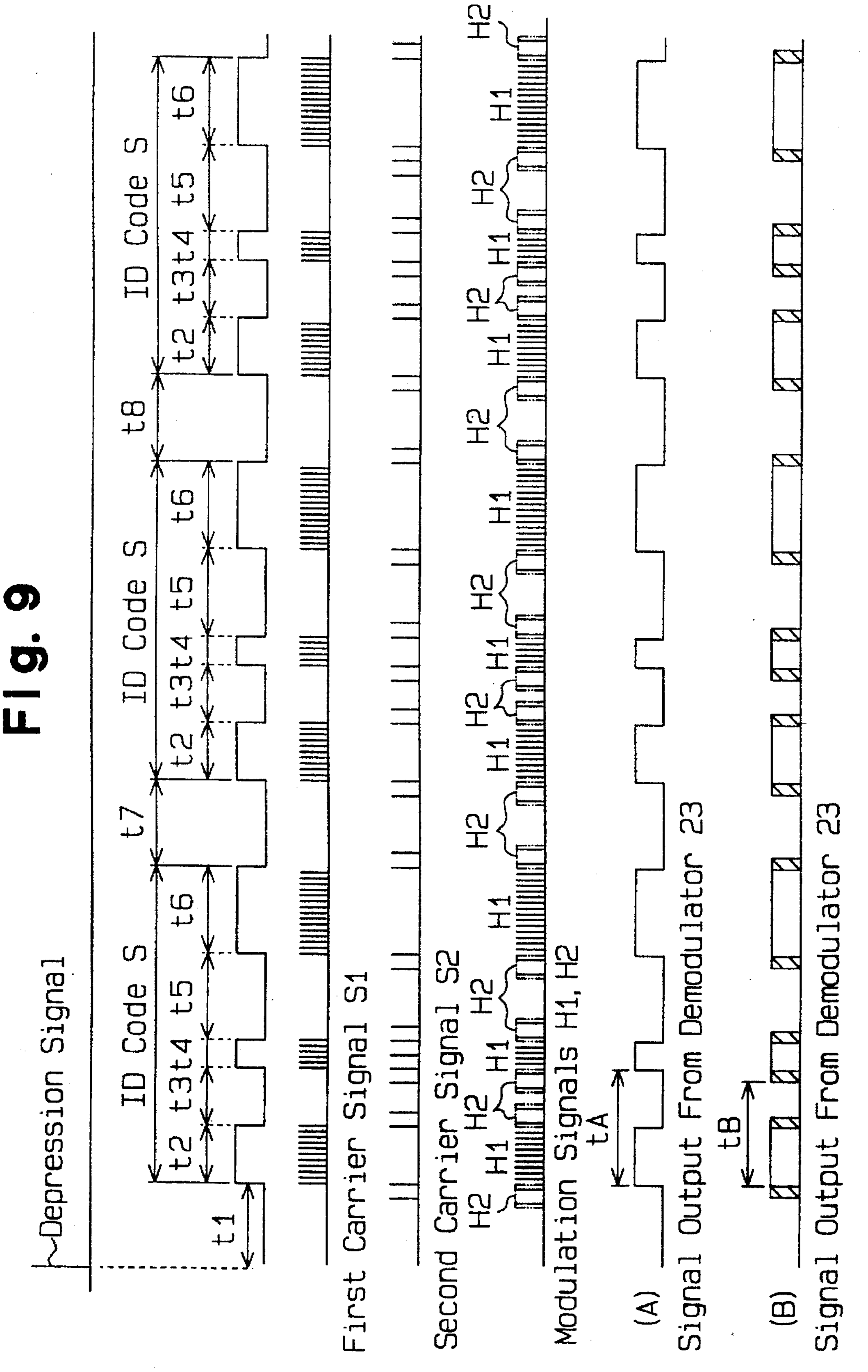
FIG. 9 is an explanatory diagram illustrating the input and output signals of yet another modulator based on the second embodiment.

Alternatively, the present invention may be modified as shown in FIG. 9. The times t1, t7 and t8, during which the individual ID codes S are not transmitted, are previously determined and the time intervals t2–t6 of the individual data of the ID code signal S are also determined previously. Therefore, the second carrier signal generator 16 divides the second carrier signal S2 having a length of a given time into multiple segments. Each of the divided second carrier signal segment may be put adjacent to the rising edge and falling edge on both sides of the H level of each data in one ID code S, so that the ID data signals and the second carrier signal segments are continuously output. In the modification shown in FIG. 9, similar advantage and effect to those of the modification of the second embodiment can be obtained.

Even if the ID data signals and the second carrier signal segments are continuously output, the modulation signal H2 corresponding to the second carrier signal S2 is normally attenuated by the filter circuit 27 in the demodulator 23 in the receiver R and only the modulation signal H1 corresponding to the first carrier signal S1 is extracted to be demodulated. As shown in (A) in FIG. 9, normally, the modulation signal H1 is demodulated and only the signal equivalent to the ID code S is output to the decoder 24.

If the performance of the filter circuit 27 deteriorates so that the modulation signal H2 corresponding to the second carrier signal S2 is also extracted and demodulated, the signals equivalent to the extracted second carrier signal segments are affixed to both sides of the signal equivalent to each ID data, as indicated in (B) in FIG. 9.

Based on the time interval tA from the rising edge of each data in the ID code S to the next rising edge, the code discriminating circuit 24 of the receiver R determines whether that data is "0" or "1". When the signals equivalent to the second carrier signal segments are affixed to both sides of the signal equivalent to the ID code data, it is determined whether that data is "0" or "1" based on the time interval tB from the rising edge of the signal equivalent to a second carrier signal segment to the rising edge of the signal equivalent to the next second carrier signal segment. Even in this case, time tA is equal to time tB. As a result, even if the performance of the filter circuit 27 deteriorates, the transmitted ID code S can substantially be prevented from changing so that the lock and unlock operations of doors can be accurately performed.

In this modification, the second carrier signal S2 which has a length of a given time is multi-segmented, each segmented second carrier signal is put adjacent to the rising and falling edges of one ID data of each ID code signal S. Although three of such ID code signals are sequentially transmitted, it may be designed such that only one ID code signal S is transmitted as needed.

Although the second carrier signal S2 which has a length of a given time is multi-segmented and each segmented second carrier signal S2 is put adjacent to the rising and falling edges of one ID data signal, it may be designed in such a way that each segmented second carrier signal S2 is affixed to only one of the rising and falling edges of one ID data signal.

The present invention is not limited to the above embodiments and modifications, but may be modified as follows without departing from the spirit or scope of the invention.

(1) Although an infrared signal is used for transmission and reception in the above embodiments, a signal with another wavelength, such as a shorter wavelength than that of infrared ray, may be used.

(2) Although the transmitter T is installed in the key holder 1 in the above embodiments, the transmitter T may be installed in an ignition key 4 as shown in FIG. 2.

(3) Although 1/α of the frequency $f_M$ of the first carrier signal S1 is used as the frequency $f_{MA}$ of the second carrier signal S2 in the above embodiments, the frequency $f_{MA}$ may be any frequency within the range included in the attenuation region of the gain-frequency characteristic of the filter circuit 27 of the receiver R. If a frequency is selected as the frequency $f_{MA}$ of the second carrier signal S2, then the filter circuit 27 should be designed to have the gain-frequency characteristic in which the attenuation region includes that selected frequency.

(4) Although the first carrier signal generator 15 and the second carrier signal generator 16 are separated from each other in the above embodiments, the following modifications are possible.

Figure 10A:
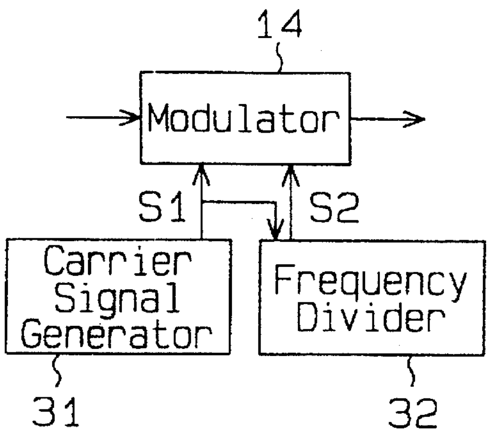

As shown in FIG. 10A, a carrier signal generator 31 for generating the first carrier signal S1 and a frequency-divider 32 may be connected to the modulator 14. The frequency-divider 32 is connected to the carrier signal generator 31. The frequency-divider 32 receives the first carrier signal S1 from the carrier signal generator 31 and generates the second carrier signal S2 to be output to the modulator 14.

Figure 10B:
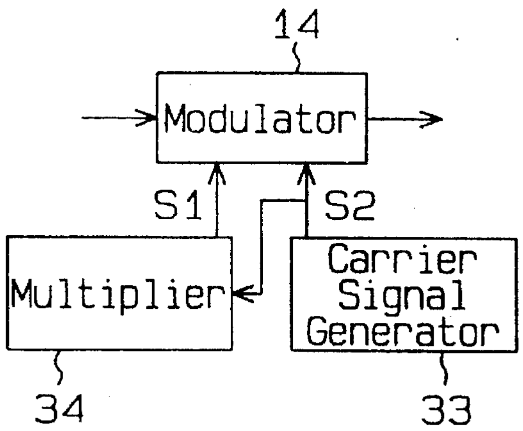

As shown in FIG. 10B, a carrier signal generator 33 for generating the second carrier signal S2 and a multiplier 34 may be connected to the modulator 14. The multiplier 34 is connected to the carrier signal generator 33. The multiplier 34 receives the second carrier signal S2 from the carrier signal generator 33 and generates the first carrier signal S1 to be output to the modulator 14.

Those circuit structures are effective when 1/α of the frequency $f_M$ of the first carrier signal S1 is used as the frequency $f_{MA}$ of the second carrier signal S2.

Figure 10C:
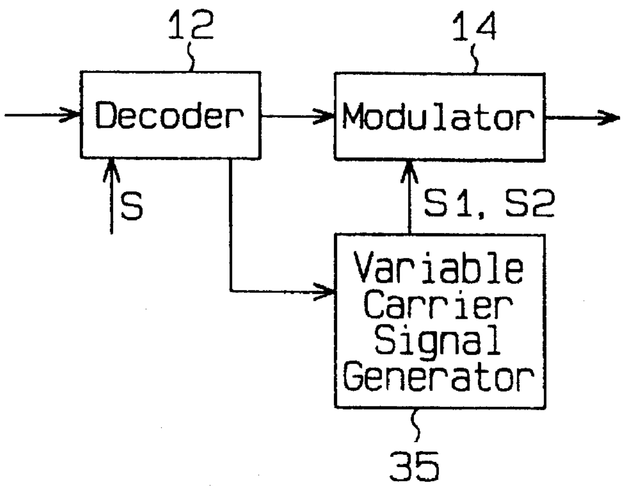
Figure 11:
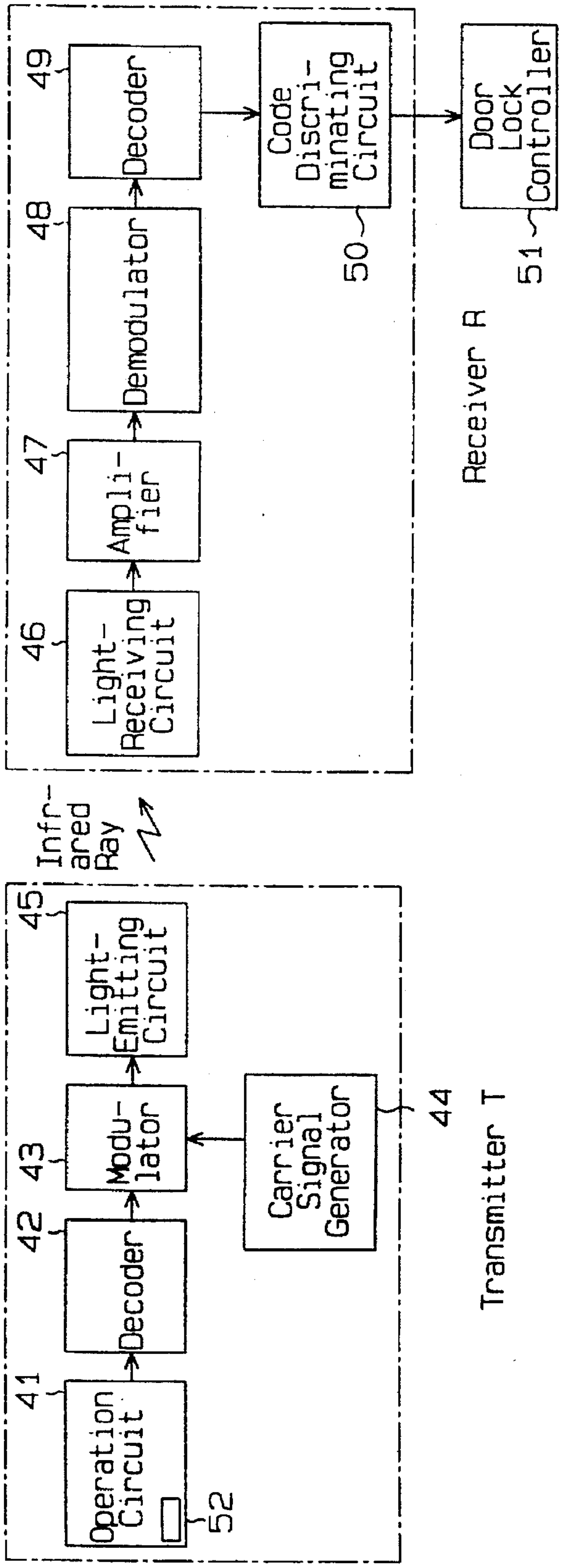
Fig. 11 (Prior Art)
FIG. 11 is a block diagram illustrating a transmitter and a receiver of a conventional remote control apparatus.

As shown in FIG. 10C, a variable carrier signal generator 35 is connected to the modulator 14. The decoder 12 is connected to the variable carrier signal generator 35. The variable carrier signal generator 35 switches its output between the first carrier signal S1 and the second carrier signal S2 in accordance with a control signal from the decoder 12, and outputs one of their signals to the modulator 14.

This circuit structure is effective when an arbitrary frequency lying in the attenuation region of the gain-frequency characteristic of the filter circuit 27 is set as the frequency $f_{MA}$ of the second carrier signal S2.

(5) Although the above embodiments have been described as adapted for a vehicular remote control apparatus, the present invention may be adapted for an apparatus of opening and closing an automatic shutter provided at a garage. In this case too, there is no possibility that data is stolen by a learning remote controller and the shutter will not be illegally open. This improves the safety of the remote control system of the shutter.

(6) The ON time period of the divided frequency $f_{MA}$ may be set shorter than its OFF time period. The shortened ON time can result in lower power consumption and elongate the life of the battery.

The technical concept other than that described in the appended claims that can be understood from the above embodiments will be given below together with their advantages.

(1) A remote control apparatus including:

first carrier signal generating means for generating a carrier signal of a first frequency used to modulate the frequency of a preset identification code signal;

transmission means for transmitting the identification code signal whose frequency is modulated; and reception means for receiving the identification code signal sent from the transmission means, characterized in that said remote control apparatus further includes:

second carrier signal generating means for generating a carrier signal of a second frequency, the second frequency lying in an attenuation region of a reception sensitivity of the reception means; and affixing means for dividing the carrier signal of the second frequency which has a length of a given time, into multiple signal segments, continuously affixing the divided signal segments to at least one of a rising edge and a falling edge of the frequency modulated identification code signal, and outputting the segment affixed identification code signal to the transmission means.

With this structure, even if the attenuation factor of the reception means falls and the carrier signal of the second frequency is output together with the identification code signal, it is possible to accurately determine whether the identification code is correct or not. This is because the output cycle or period of the identification code is constant.

We claim:

1. A remote control system comprising:

means for producing an identification code signal, first carrier signal generating means for generating a first carrier signal of a first frequency, means for producing a modulated carrier signal by modulating said first carrier signal with said identification code signal, second carrier signal generating means for generating a second carrier signal of a second frequency different from said first frequency, means for adding at least a predetermined duration of said second carrier signal to at least a portion of said modulated carrier signal sufficient to inhibit unauthorized detection of said code signal thereby producing a transmission signal, and transmission means for transmitting said transmission signal.

2. A remote control system according to claim 1, further comprising reception means for receiving said transmission signal and detecting said identification code signal by filtering out said second carrier signal and demodulating said modulated carrier signal.

3. A remote control system according to claim 2, wherein the total duration of said second carrier signal is sufficient to inhibit interception of said code signal by a learning remote controller.

4. A remote control system according to claim 1, wherein the total duration of said second carrier signal is sufficient to inhibit interception of said code signal by a learning remote controller.

5. A remote control system according to claim 1, wherein said second carrier signal is added to a plurality of portions of said modulated carrier signal with a total duration sufficient to inhibit said unauthorized detection of said code signal.

6. A remote control system according to claim 5, further comprising reception means for receiving said transmission signal and detecting said identification code signal by filtering out said second carrier signal and demodulating said modulated carrier signal.

7. A remote control system according to claim 1 or 2, wherein said predetermined duration of said second carrier signal is added to said modulated carrier signal at the beginning of said identification code signal.

8. A remote control system according to claim 1 or 2, wherein said first carrier signal is modulated repeatedly with said identification code signal to produce a plurality of modulated code signals on said modulated carrier signal.

9. A remote control system according to claim 8, wherein said second carrier signal is added to a plurality of portions of said modulated carrier signal with a total duration sufficient to inhibit said unauthorized detection of said code signal.

10. A remote control system according to claim 8, wherein said second carrier signal is added to said modulated carrier signal at the beginning of each of said identification code signals.

11. A remote control system according to claim 1 or 2, wherein one of said carrier signal generating means comprises means for dividing or multiplying the frequency of the signal produced by the other of said carrier signal generating means.

12. A method for remote control comprising in combination the steps of:

generating a first carrier signal at a first frequency;

generating a second carrier signal at a second frequency;

modulating said first carrier signal using an identification code signal to produce a modulated signal;

generating and transmitting a transmission signal comprising a predetermined duration of said second carrier signal added to at least a portion of said modulated signal where said duration is chosen sufficient to inhibit unauthorized detection of said identification code signal; and receiving and demodulating said transmission signal using said first carrier signal to the exclusion of said second carrier signal for extracting said identification code signal from said transmission signal.

13. A method for remote control according to claim 12, wherein said demodulating step further comprises the step of filtering out said second carrier signal from said transmission signal.

* * * * *